US012722646B2

(12) United States Patent
Yamada

(10) Patent No.: US 12,722,646 B2
(45) Date of Patent: Sep. 1, 2026

(54) MANAGER, CONTROL METHOD, STORAGE MEDIUM, AND VEHICLE

(71) Applicant: TOYOTA JIDOSHA KABUSHIKI KAISHA, Toyota (JP)

(72) Inventor: Yoshihisa Yamada, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 243 days.

(21) Appl. No.: 17/830,527

(22) Filed: Jun. 2, 2022

(65) Prior Publication Data

US 2022/0388520 A1 Dec. 8, 2022

(30) Foreign Application Priority Data

Jun. 8, 2021 (JP) ................................ 2021-095919

(51) Int. Cl.
*B60W 40/13* (2012.01)
*B60W 50/08* (2020.01)
*B62D 15/02* (2006.01)

(52) U.S. Cl.
CPC .......... *B60W 40/13* (2013.01); *B60W 50/085* (2013.01); *B62D 15/021* (2013.01); *B60W 2040/1315* (2013.01); *B60W 2520/14* (2013.01); *B60W 2520/20* (2013.01)

(58) Field of Classification Search
CPC ............... B60W 40/13; B60W 50/085; B60W 2040/1315; B60W 2520/14; B60W 2520/20; B62D 15/021
See application file for complete search history.

(56) References Cited

U.S. PATENT DOCUMENTS

| | | | | |
|---|---|---|---|---|
| 2015/0274162 | A1* | 10/2015 | Sato | B60W 30/16 701/1 |
| 2020/0070849 | A1* | 3/2020 | Suzuki | B60W 10/20 |
| 2021/0237798 | A1* | 8/2021 | Yamada | B60W 30/12 |

FOREIGN PATENT DOCUMENTS

| | | | |
|---|---|---|---|
| CN | 110871788 | A | 3/2020 |
| JP | 2017-001561 | A | 1/2017 |
| JP | 2020-032893 | A | 3/2020 |
| JP | 2020-032894 | A | 3/2020 |

OTHER PUBLICATIONS

Mar. 25, 2025 Office Action issued in Chinese Patent Application No. 202210630796.3. (partial English translation).
"Automotive Multibody Dynamics and Computer Simulation", Guillin Science and Technology Press, 1st edition, p. 82, Dec. 1998.
Micke, M. "Automotive Kinetics", Person Traffic Press, 1st edition, p. 9, Sep. 1997.

* cited by examiner

*Primary Examiner* — Andrew J Cromer
(74) *Attorney, Agent, or Firm* — Oliff PLC

(57) ABSTRACT

A manager is installed in a vehicle. The manager includes: an accepting unit that accepts, from a plurality of advanced driver assistance system applications, a plurality of kinematic plans including first information that is information representing lateral-direction motion of the vehicle; an arbitration unit that performs arbitration of the kinematic plans; a first output unit that distributes a motion request based on a result of arbitration performed by the arbitration unit to at least one of a plurality of actuator systems; and a second output unit that outputs second information used for generating the first information to at least one of the ADAS applications.

9 Claims, 4 Drawing Sheets

MANAGER, CONTROL METHOD, STORAGE MEDIUM, AND VEHICLE

CROSS-REFERENCE TO RELATED APPLICATION

This application claims priority to Japanese Patent Application No. 2021-095919 filed on Jun. 8, 2021, incorporated herein by reference in its entirety.

BACKGROUND

1. Technical Field

The present disclosure relates to a manager installed in a vehicle, a control method, a storage medium, and a vehicle.

2. Description of Related Art

In recent years, a plurality of applications that realize functions such as driver assistance functions (autonomous driving, automatic parking, advanced driver assistance, etc.) have been implemented in vehicles. When more than one application is installed, a plurality of requests may be generated for one actuator system (e.g., a steering device) installed in the vehicle in some cases.

Japanese Unexamined Patent Application Publication No. 2020-032894 (JP 2020-032894 A) and Japanese Unexamined Patent Application Publication No. 2020-032893 (JP 2020-032893 A) disclose a control device (manager) that accepts a plurality of requests output from a plurality of applications to an actuator system, arbitrates the accepted requests, and outputs a request for driving the actuator system based on arbitration results.

SUMMARY

Requests for controlling movement of the vehicle that are output to the manager by an advanced driver assistance system (ADAS) application that realizes the function of advanced driver assistance includes information indicating motion of the vehicle in a lateral direction. However, how to generate information representing lateral-direction motion of the vehicle in ADAS applications has not been studied in detail.

The present disclosure provides a manager or the like that outputs information necessary for generating information representing lateral-direction motion of a vehicle to ADAS applications.

An aspect of the present disclosure relates to a manager installed in a vehicle. The manager includes one or more processors configured to: accept, from a plurality of advanced driver assistance system (ADAS) applications, a plurality of kinematic plans including first information that is information representing lateral-direction motion of the vehicle; perform arbitration of the kinematic plans; distribute a motion request based on a result of arbitration to at least one of a plurality of actuator systems; and output second information used for generating the first information to at least one of the ADAS applications.

An aspect of the present disclosure relates to a vehicle in which the manager described above is installed.

An aspect of the present disclosure relates to a control method executed by a computer of a manager installed in a vehicle. The computer includes a processor and memory. The control method includes: accepting, from a plurality of ADAS applications, a plurality of kinematic plans including first information that is information representing lateral-direction motion of the vehicle; performing arbitration of the kinematic plans; distributing a motion request based on a result of the arbitration to at least one of a plurality of actuator systems; and outputting second information used for generating the first information to at least one of the ADAS applications.

An aspect of the present disclosure relates to a non-transitory computer-readable storage medium storing a program. When the program is executed by a computer of a manager installed in a vehicle, the program causes the computer to: accept, from a plurality of ADAS applications, a plurality of kinematic plans including first information that is information representing lateral-direction motion of the vehicle; perform arbitration of the kinematic plans; distribute a motion request based on a result of the arbitration to at least one of a plurality of actuator systems; and outputting second information used for generating the first information to at least one of the ADAS applications.

According to the present disclosure, the manager outputs the second information necessary for generating the first information representing the lateral-direction motion of the vehicle to the ADAS application, and accordingly the ADAS application can easily generate the first information representing the lateral-direction motion of the vehicle, based on this second information.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

In a vehicle system according to the present disclosure, a manager outputs information necessary for generating a steering angle, a curvature, and so forth, representing a lateral-direction motion of a vehicle, to an ADAS application. Accordingly, the ADAS application can easily generate the steering angle, the curvature, and so forth, representing the lateral-direction motion of the vehicle, based on the information acquired from the manager.

An embodiment of the present disclosure will be described below in detail with reference to the drawings.

Embodiment

Configuration

Figure 1:
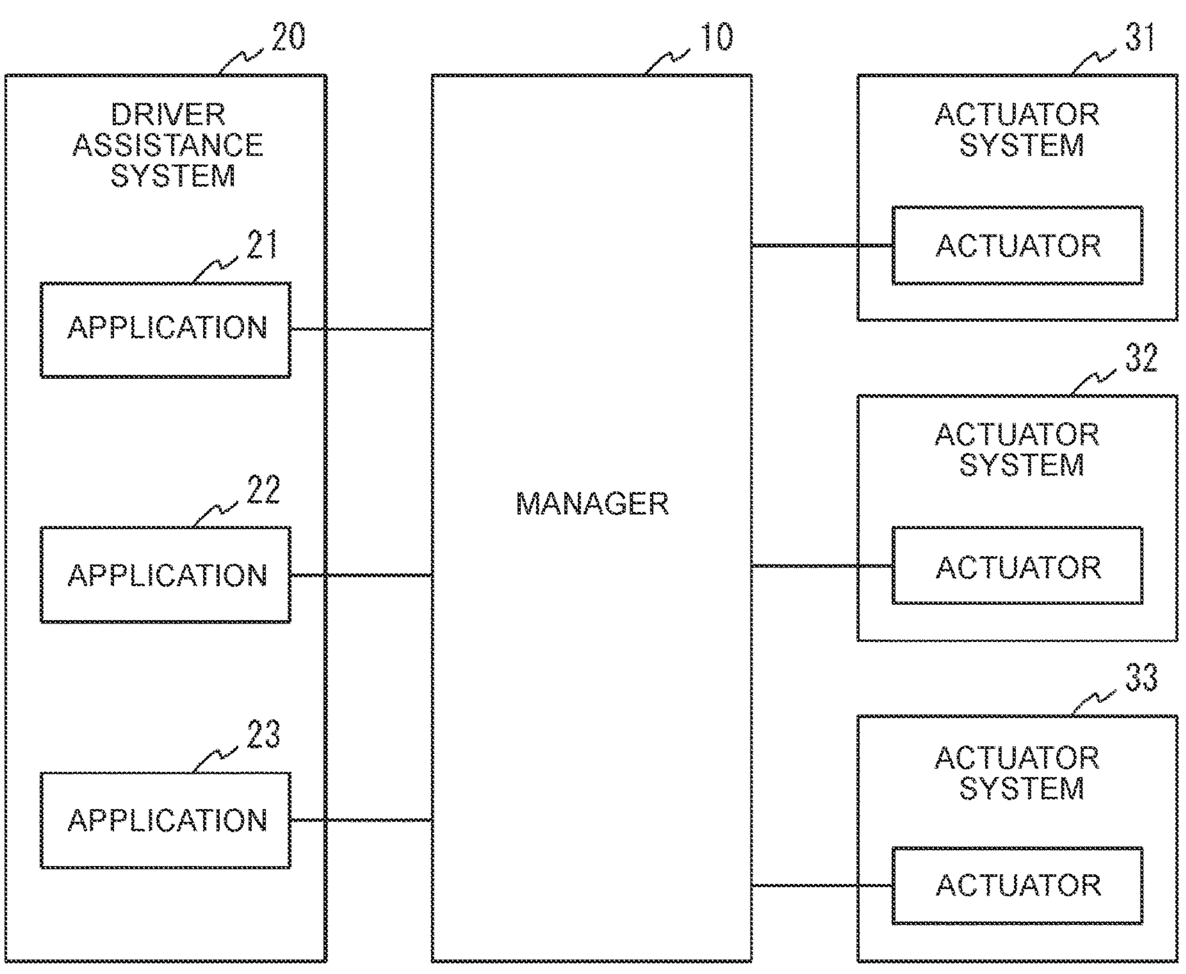
FIG. 1 is a block diagram illustrating a schematic configuration of a system according to an embodiment of the present disclosure.

FIG. 1 is a schematic diagram illustrating a configuration example of a system installed in a vehicle according to an embodiment of the present disclosure. A vehicle system 1 illustrated in FIG. 1 includes a manager 10, a driver assistance system 20, and a plurality of actuator systems 31 to 33. The configurations provided to the vehicle system 1 are communicably connected via an in-vehicle network such as a controller area network (CAN) or Ethernet (registered trademark).

The driver assistance system 20 is a configuration for realizing various functions for assisting driving of the vehicle, including at least drive control and braking control of the vehicle, by executing one or more of applications 21 to 23 that are installed. Examples of the applications 21 to 23 installed in the driver assistance system 20 include an autonomous driving application that realizes autonomous driving functions, an automatic parking application that realizes automatic parking functions, an ADAS application that realizes advanced driver assistance functions, and so forth. Examples of the ADAS application include applications that realize functions of collision avoidance assistance (pre-crash safety (PCS), etc.), applications that realize functions of following a vehicle traveling ahead (adaptive cruise control (ACC), etc.) to travel while keeping a predetermined distance from the vehicle traveling ahead, applications that realize functions of lane keeping assistance (lane keeping assist (LKA), lane tracing assist (LTA), etc.) for staying in the lane that the vehicle is currently traveling in, applications that realize functions of collision damage mitigation braking (automated emergency braking (AEB), etc.) for automatically applying the brakes to reduce damage in a collision, and applications that realize functions of lane deviation warning (lane departure warning (LDW), lane departure alert (LDA), etc.) for warning a driver about deviation from the lane that the vehicle is currently traveling in.

Each application 21 to 23 of the driver assistance system 20 outputs a kinematic plan request guaranteeing functionality (merchantability) of the application alone to the manager 10, as an application request, based on vehicle information (recognition sensor information and so forth) acquired (input) from various types of sensors and so forth that are omitted from illustration. This kinematic plan includes requests for acceleration and deceleration in a front-rear direction, and so forth, as information representing motion of the vehicle in the front-rear direction (longitudinal direction). Also, the kinematic plan includes requests for steering angle and curvature (or radius of curvature) and so forth, as information representing motion of the vehicle in the lateral direction (hereinafter referred to as "first information"). Information representing the lateral-direction motion of the vehicle is information representing the motion of the vehicle in a direction intersecting the front-rear direction of the vehicle on a plane orthogonal to an up-down direction of the vehicle. Each application 21 to 23 can also output identification information (application ID), which can uniquely identify the application thereof, to the manager 10 along with the kinematic plan. The application ID is uniquely set in advance for each application.

The driver assistance system 20 is realized by a computer such as an electronic control unit (ECU) having a processor such as a control processing unit (CPU), memory, and an input/output interface. Note that the number of ECUs making up the driver assistance system 20 and the number of applications installed in the ECUs are not particularly limited. Also, a separate ECU may be provided for each application in the driver assistance system 20. For example, the driver assistance system 20 may be made up of an autonomous driving ECU in which the autonomous driving application is installed, an automatic parking ECU in which the automatic parking application is installed, and an ADAS-ECU in which the advanced driver assistance application is installed. Also, a plurality of ADAS applications may be installed in a plurality of ECUs, such as an ECU in which an ADAS application that realizes an ACC function is installed, an ECU in which an ADAS application that realizes an LKA function is installed, and an ECU in which an ADAS application that realizes an AEB function is installed.

The actuator systems 31 to 33 are components of a realization system for realizing kinematic plan requests that are output by each of the applications 21 to 23 of the driver assistance system 20. An example of the actuator systems 31 to 33 is an electric power steering (EPS) system that includes a steering actuator (an EPS motor and so forth) capable of generating a torque to assist steering by a steering wheel on a steering shaft, which realizes part or all of kinematic plan requests by controlling operations of this steering actuator. Another example of the actuator systems 31 to 33 is an electronic brake system (EBS) that includes a brake actuator (hydraulic brakes and so forth) capable of generating braking force in the vehicle, which realizes part or all of kinematic plan requests by controlling operations of this brake actuator. A further example of the actuator systems 31 to 33 is a powertrain system that includes a powertrain actuator (engine, transmission, and so forth) capable of generating braking/driving force in the vehicle, which realizes part or all of kinematic plan requests by controlling operations of this powertrain actuator. Note that the number of actuator systems installed in the vehicle is not particularly limited to the three illustrated in FIG. 1.

The manager 10 determines control contents related to motion of the vehicle based on kinematic plan requests accepted from the applications 21 to 23 of the driver assistance system 20, and outputs requests to at least one of the actuator systems 31 to 33 based on the determined control contents as necessary. In other words, the manager 10 distributes motion requests to one or more of the actuator systems 31 to 33.

Figure 2:
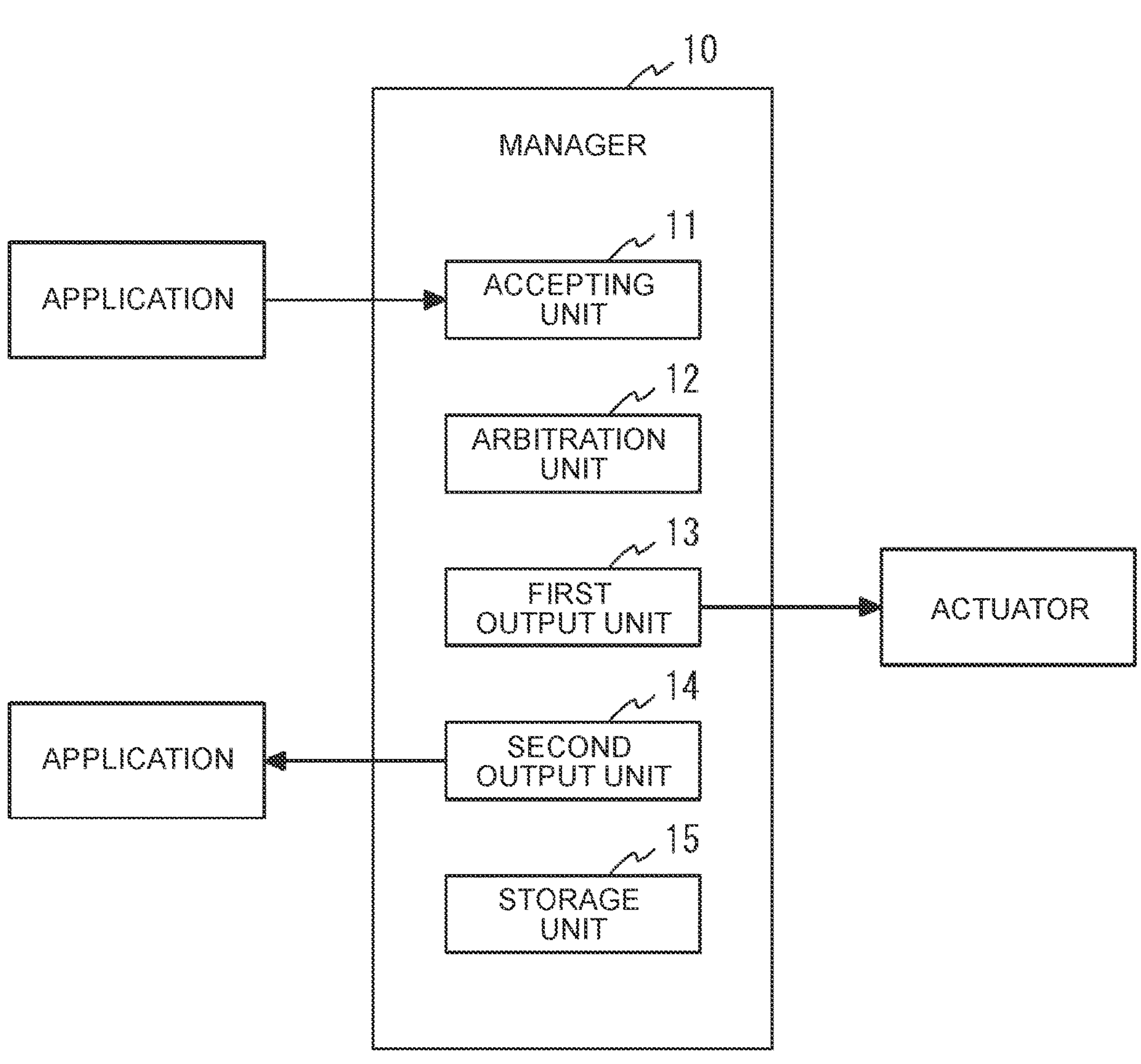
FIG. 2 is a functional block diagram of a manager illustrated in FIG. 1.

The manager 10 controls the motion of the vehicle by functioning as an ADAS manager (MGR), a vehicle MGR, or the like, involved in so-called vehicle motion or as a part of the ADAS MGR or the vehicle MGR. FIG. 2 illustrates an example of a functional block diagram of the manager 10. The manager 10 illustrated in FIG. 2 includes an accepting unit 11, an arbitration unit 12, a first output unit 13, a second output unit 14, and a storage unit 15.

The accepting unit 11 accepts one or more kinematic plan requests output by the applications 21 to 23 of the driver assistance system 20. Kinematic plans in the present embodiment include the steering angle or the curvature (or the radius of curvature) as first information representing the lateral-direction motion of the vehicle output by the ADAS application. Kinematic plan requests accepted by the accepting unit 11 are output to the arbitration unit 12.

The arbitration unit 12 performs arbitration regarding the one or more kinematic plan requests accepted from the applications 21 to 23 of the driver assistance system 20 by the accepting unit 11. Examples of a process of this arbitration include a process in which one kinematic plan is selected from the kinematic plans based on a predetermined selection criterion (for example, minimum selection). As another arbitration process, a new kinematic plan may be set based on the kinematic plans. When there is only one kinematic plan request, that kinematic plan is adopted as the result of arbitration.

The first output unit 13 outputs a motion request based on the arbitration result of the kinematic plan requests at the arbitration unit 12 to at least one of the actuator systems 31 to 33. This motion request is a physical quantity that requests motion of the vehicle to realize the arbitrated kinematic plan, and is a physical quantity suitable for the actuator system to which output is to be performed. This physical quantity is converted as needed. For example, when the actuator system to which output is to be performed is the EPS system, the steering angle of wheels (the steering angle of the steering system) is output as a motion request.

The second output unit 14 outputs information and data (hereinafter referred to as "second information") used to generate the first information representing the lateral-direction motion of the vehicle to be included in kinematic plans by the applications 21 to 23 of the driver assistance system 20, to at least one of the applications 21 to 23. The second information includes, for example, at least one of information regarding specifications (constants) of the vehicle, such as the distance from the center of gravity of the vehicle to the front wheels, the distance from the center of gravity of the vehicle to the rear wheels, a cornering stiffness generated at the front tires, and a cornering stiffness generated at the rear tires, and information regarding state (variables) of the vehicle, such as the mass of the vehicle, the traveling velocity of the vehicle, the slip angle (or vehicle body slip angle) of the center of gravity of the vehicle, and the yaw rate. Information regarding the specifications (constants) of the vehicle is stored in the storage unit 15, and will be described later. Information regarding the state (variables) of the vehicle can be obtained from various types of in-vehicle equipment that are omitted from illustration.

More specifically, when the first information accepted by the accepting unit 11 from the applications 21 to 23 is the steering angle, the second output unit 14 outputs the distances from the center of gravity of the vehicle to the front and rear wheels, the cornering stiffness generated by the front and rear tires, the mass of the vehicle, the velocity, the slip angle, and the yaw rate, as second information, to the application that generates the first information. Also, when the first information accepted by the accepting unit 11 from the applications 21 to 23 is the curvature or the radius of curvature, the second output unit 14 outputs the vehicle velocity, the slip angle, and the yaw rate, as second information, to the application that generates the first information.

The storage unit 15 stores information regarding specifications (constants) of the vehicle, such as the distance from the center of gravity of the vehicle to the front wheels, the distance from the center of gravity of the vehicle to the rear wheels, the cornering stiffness generated by the front tires, and the cornering stiffness generated by rear tires, which is the second information output by the second output unit 14 to the applications 21 to 23.

Note that the configuration of the manager 10, the driver assistance system 20, and the actuator systems 31 to 33 installed in the vehicle, which are described above, are exemplary, and may be added, replaced, changed, omitted, and so forth, as appropriate. Also, the functions of various pieces of equipment can be implemented by integration of the functions thereof into one piece of equipment, or by distribution of the functions thereof between or among a plurality of pieces of equipment, or the like, as appropriate.

First Information Generation Technique

Figure 3:
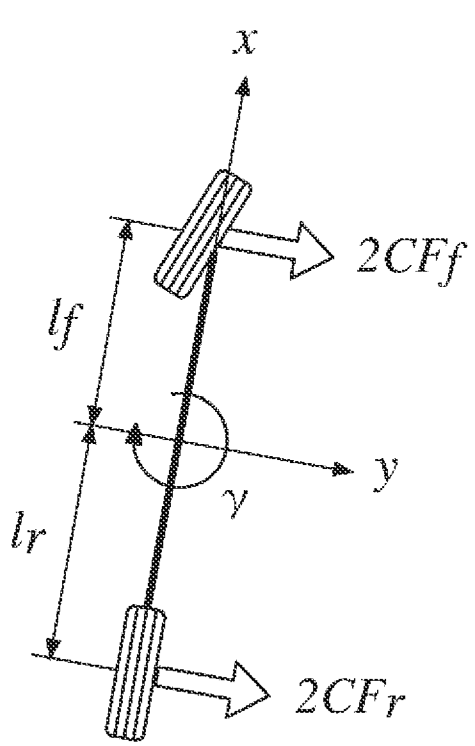
FIG. 3 is a diagram for explaining an equation of motion for a two-wheel model.

A technique for generating the first information based on the second information, which is performed by the applications 21 to 23, will be described with further reference to FIGS. 3 and 4.

(1) First Example

In a first example, a technique of generating the steering angle as the first information is described. FIG. 3 is a diagram for describing an equation of motion for a two-wheel model.

Assuming that cornering force acts in a y-axis direction, when a vehicle with a mass m is traveling at a constant velocity V, the equation of motion of the vehicle is found by the following Expression [1], with respect to the slip angle (or vehicle body slip angle) β of the center of gravity of the vehicle, and the yaw rate γ of the vehicle. In Expression [1], I represents the moment of inertia. lf represents the distance from the center of gravity of the vehicle to the front wheel. lr represents the distance from the center of gravity of the vehicle to the rear wheel. CFf represents the cornering force of the front wheel. CFr represents the cornering force of the rear wheel.

Expression 1

$$\left.\begin{aligned} mV(\dot{\beta}+\gamma) &= 2CF_f + 2CF_r \\ I\dot{\gamma} &= 2l_f CF_f - 2l_r CF_r \end{aligned}\right\} \quad [1]$$

Substituting the linear model of the cornering force according to the following Expression [2] into the above Expression [1] yields the following Expression [3]. Kf represents the cornering stiffness generated at the front tire. Kr represents the cornering stiffness generated at the rear tire.

Expression 2

$$CF_f = -K_f\beta_f,\ CF_r = -K_r\beta_r \quad [2]$$

Expression 3

$$\left.\begin{aligned} mV(\dot{\beta}+\gamma) &= -2K_f\beta_f - 2K_r\beta_r \\ I\dot{\gamma} &= -2l_f K_f\beta_f + 2l_r K_r\beta_r \end{aligned}\right\} \quad [3]$$

Further, substituting the relation of slip angle of the tires according to the following Expression [4] into the above Expression [3] yields the following Expression [5]. In the Expressions, βf represents the slip angle of the front tire, and βr represents the slip angle of the rear tire. Further, δ is the steering angle of the front wheel.

Expression 4

$$\beta_f = \beta + \frac{l_f}{V}\gamma - \delta,\ \beta_r = \beta - \frac{l_r}{V}\gamma \quad [4]$$

Expression 5

$$\left.\begin{aligned} mV(\dot{\beta}+\gamma) &= -2K_f\left(\beta + \frac{l_f}{V}\gamma - \delta\right) - 2K_r\left(\beta - \frac{l_r}{V}\gamma\right) \\ I\dot{\gamma} &= -2l_f K_f\left(\beta + \frac{l_f}{V}\gamma - \delta\right) + 2l_r K_r\left(\beta - \frac{l_r}{V}\gamma\right) \end{aligned}\right\} \quad [5]$$

Rearranging the above Expression [5] with focus on the steering angle δ of the front wheel yields the following Expression [6].

Expression 6

$$\left.\begin{aligned} mV\dot{\beta} + 2(K_f + K_r)\beta + \left\{mV + \frac{2}{V}(l_f K_f - l_r K_r)\right\}\gamma &= 2K_f\delta \\ I\dot{\gamma} + 2(l_f K_f - l_r K_r)\beta + \frac{2}{V}(l_f^2 K_f + l_r^2 K_r)\gamma &= 2l_f K_f\delta \end{aligned}\right\} \quad [6]$$

Thus, the applications 21 to 23 can easily generate the steering angle δ of the front wheel (first information) based on the distance lf from the center of gravity of the vehicle to the front wheel, the distance lr from the center of gravity of the vehicle to the rear wheel, the cornering stiffness Kf generated at the front tire, the cornering stiffness Kr generated at the rear tire, the mass m of the vehicle, the velocity V, the slip angle β, and the yaw rate γ, which are acquired from the manager 10 as the second information.

(2) Second Example

A second example describes a technique of generating the curvature as the second information. FIG. 4 is a diagram for describing a relation between curvature and acceleration.

Figure 4:
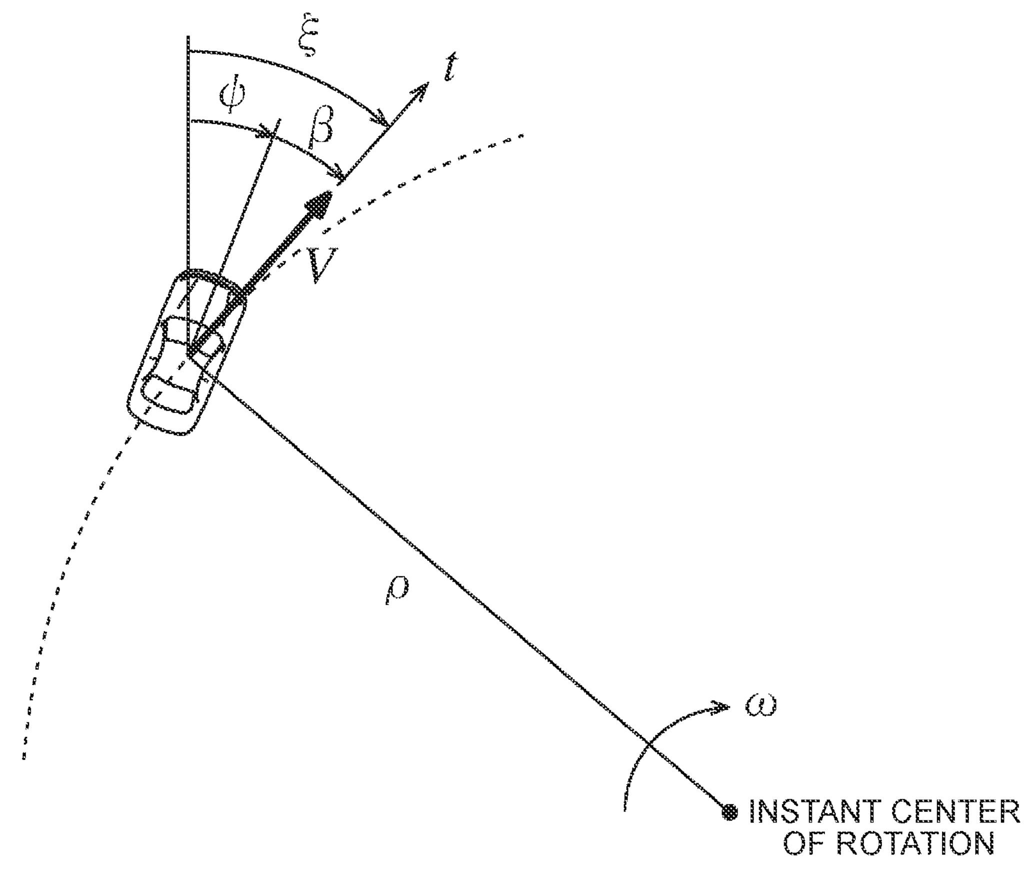
FIG. 4 is a diagram for explaining a relation between curvature and acceleration.

In FIG. 4, tangential velocity V can be expressed by the following Expression [7] based on the radius of curvature ρ and angular velocity ω.

$$V=\rho\omega \quad \text{Expression 7}$$

The above Expression [7] can be modified as in the following Expression [8], and the radius of curvature p and the curvature 1/ρ, which is the inverse of the radius of curvature, can be expressed using the velocity V of the vehicle and the slip angle of the center of gravity (or the vehicle body slip angle) β, and the yaw rate γ of the vehicle.

Expression 8

$$\begin{aligned} \frac{V}{\rho} &= \omega \\ &= \dot{\xi} \\ &= \dot{\phi} + \dot{\beta} \\ &= \gamma + \dot{\beta} \end{aligned} \quad [8]$$

Accordingly, the acceleration in a direction of the normal can be obtained by the following Expression [9].

Expression 9

$$\frac{V^2}{\rho} = V(\gamma + \dot{\beta}) \quad [9]$$

Thus, the applications 21 to 23 can easily generate the curvature 1/ρ or the radius of curvature ρ (first information) based on the vehicle velocity V, the slip angle β, and the yaw rate γ acquired from the manager 10 as the second information.

Operations and Effects

As described above, in the vehicle system according to the embodiment of the present disclosure, the manager outputs information (second information) necessary for generating information (first information) representing lateral-direction motion of the vehicle to at least one of the ADAS applications. Accordingly, the ADAS application that acquires the second information can calculate information that represents the lateral-direction motion of the vehicle (steering angle, curvature, etc.) at the time of acquisition, based on the specifications and the state of the vehicle as the second information acquired from the manager through feedback, and can correct the kinematic plan being requested as appropriate, based on the calculated values.

Further, in the vehicle system according to the embodiment of the present disclosure, the manager holds or generates the information (second information) necessary for generating the information (first information) representing the lateral-direction motion of the vehicle. Accordingly, the precision of the second information can be improved. Also, the ADAS application does not need to set and hold information such as specifications of the vehicle in advance, and accordingly the application specifications can be simplified.

Further, in the vehicle system according to the embodiment of the present disclosure, when the curvature or the radius of curvature is used as the information (first information) representing the lateral-direction motion of the vehicle, less information (data) is required for the calculation, and accordingly reduction in the processing load of the electronic control unit (ECU) in which the ADAS application is installed, and reduction in the communication load between the manager and the ADAS application, can be realized.

While an embodiment of the technology according to the present disclosure has been described above, the present disclosure is not limited to a manager installed in a vehicle, and can be understood as being an electronic control unit, a system including an electronic control unit and a manager, a control method executed by a manager including a processor and memory and a storage device, a control program, a non-transitory computer-readable storage medium storing the control program, a vehicle including a manager, and so forth.

The present disclosure is useful in a manager installed in a vehicle, and so forth.

What is claimed is:

1. A manager installed in a vehicle, the manager comprising one or more processors configured to:

accept, from a plurality of advanced driver assistance system (ADAS) applications, a plurality of kinematic plans including first information that is information representing lateral-direction motion of the vehicle;

perform arbitration of the kinematic plans;

distribute a motion request based on a result of the arbitration to at least one of a plurality of actuator systems;

select second information used for generating the first information from among stored multiple types of second information, based on the first information; and output the selected second information used for generating the first information to at least one of the ADAS applications.

2. The manager according to claim 1, wherein the second information includes at least one of a distance from a center of gravity of the vehicle to a front wheel, a distance from the center of gravity of the vehicle to a rear wheel, a cornering stiffness generated at a tire, a mass of the vehicle, a velocity, a slip angle, and a yaw rate.

3. The manager according to claim 2, wherein:

the first information representing the lateral-direction motion is a steering angle; and the one or more processors are configured to output, as the second information, the distance from the center of gravity of the vehicle to the front wheel, the distance from the center of gravity of the vehicle to the rear wheel, a cornering stiffness generated at a front tire, a cornering stiffness generated at a rear tire, the mass of the vehicle, the velocity, the slip angle, and the yaw rate.

4. The manager according to claim 2, wherein:

the first information representing the lateral-direction motion is a curvature or a radius of curvature; and the one or more processors are configured to output, as the second information, the velocity, the slip angle, and the yaw rate.

5. A vehicle in which the manager according to claim 1 is installed.

6. The manager according to claim 1, wherein the second information includes a constant value that defines a characteristic of the vehicle, and a variable value that is obtained from an in-vehicle equipment component.

7. The manager according to claim 6, wherein the constant value is one of a plurality of constant values that each define a characteristic of the vehicle, and the variable value is one of a plurality of variable values that are each obtained from an in-vehicle equipment component.

8. A control method executed by a computer of a manager including a processor and memory and installed in a vehicle, the control method comprising:

accepting, from a plurality of ADAS applications, a plurality of kinematic plans including first information that is information representing lateral-direction motion of the vehicle;

performing arbitration of the kinematic plans;

distributing a motion request based on a result of the arbitration to at least one of a plurality of actuator systems;

selecting second information used for generating the first information from among stored multiple types of second information, based on the first information; and outputting the selected second information used for generating the first information to at least one of the ADAS applications.

9. A non-transitory computer-readable storage medium storing a program that, when executed by a computer of a manager installed in a vehicle, causes the computer to steps comprising:

accepting, from a plurality of ADAS applications, a plurality of kinematic plans including first information that is information representing lateral-direction motion of the vehicle;

performing arbitration of the kinematic plans;

distributing a motion request based on a result of the arbitration to at least one of a plurality of actuator systems;

selecting second information used for generating the first information from among stored multiple types of second information, based on the first information; and outputting second information used for generating the first information to at least one of the ADAS applications.

* * * * *